United States Patent

[11] 3,617,521

| [72] | Inventors | Robert J. Houston<br>San Rafael;<br>Sigmund M. Csicsery, Lafayette, both of Calif. |
|---|---|---|
| [21] | Appl. No. | 840,917 |
| [22] | Filed | July 11, 1969 |
| [45] | Patented | Nov. 2, 1971 |
| [73] | Assignee | Chevron Research Company<br>San Francisco, Calif. |

[54] REFORMING PROCESS WITH A CATALYST MIXTURE
17 Claims, 3 Drawing Figs.

[52] U.S. Cl. .................................................. 208/138,
252/466 PT, 260/668 D
[51] Int. Cl. ..................................................... C10g 35/08
[50] Field of Search ........................................... 208/138,
139; 260/668 D; 252/455 Z, 466

[56] References Cited
UNITED STATES PATENTS

| 1,840,450 | 1/1932 | Jaeger et al. ................... | 252/455 |
| 1,914,722 | 7/1933 | Jaeger .......................... | 208/46 |
| 3,211,537 | 10/1965 | Groebe et al. ................. | 208/139 |
| 3,252,757 | 5/1966 | Granquist ...................... | 252/455 |
| 3,252,889 | 5/1966 | Capell et al. ................... | 23/110 |

*Primary Examiner*—Herbert Levine
*Attorneys*—A. L. Snow, F. E. Johnston, C. J. Tonkin and Dix A. Newell

ABSTRACT: A naphtha feed is reformed in the presence of hydrogen at reforming conditions with a catalyst comprising a mixture of (1) a layered crystalline clay-type aluminosilicate and (2) a platinum group component in association with a porous solid carrier.

INVENTORS
ROBERT J. HOUSTON
SIGMUND M. CSICSERY

3,617,521

REFORMING PROCESS WITH A CATALYST MIXTURE

BACKGROUND OF THE INVENTION

1. Field

The present invention relates to reforming of hydrocarbons. Particularly, the present invention relates to the reforming of hydrocarbons with a catalyst comprising a mixture of two components, one component being a layered crystalline clay-type aluminosilicate and the other component being a platinum group component in association with a porous amorphous solid carrier, for example, alumina.

2. Prior Art

Catalytic reforming is well known in the petroleum industry and refers to the treatment of hydrocarbon feedstocks to improve the octane rating. In reforming a number of reactions occur with each reaction being favored by a given set of conditions. The more important hydrocarbon reactions occurring during the reforming operations employing catalysts comprising dehydrogenation promoting metal components include dehydrogenation of naphthenes to aromatics, dehydrocyclization of normal paraffins to naphthenes and aromatics, isomerization of normal paraffins to isoparaffins, and hydrocracking of relatively long-chained paraffins. The predominant reactions in the first stages of reforming are dehydrogenation to convert $C_6$-ring naphthenes to aromatics and dehydroisomerization to convert alkylcyclopentanes, e.g., methylcyclopentane, to aromatics, major octane-improving conversions. The major reforming reactions which occur in the intermediate and later stages of reforming are dehydrocyclization of paraffins to aromatics and hydrocracking of high molecular weight hydrocarbons to lower molecular weight hydrocarbons.

Significant reforming of hydrocarbons can occur by using a single reactor system containing a reforming catalyst. However, to take advantage of the reaction sequence, it has become a general practice in catalytic reforming to employ in combination a plurality of fixed bed reactors, preferably adiabatic reactors, in series with provision for reheating hydrocarbon reactants between reactors. Generally the pressure employed in each reactor is decreased in the direction of hydrocarbon flow to avoid use of expensive compressors between reactor stages. The reactor inlet temperatures are dependent upon the feedstock, the composition, the feed hydrogen to hydrocarbon ratio, the reactant space velocity, type and distribution of catalyst among the several reactors, the degree of conversion desired, and the product selectivity desired from each reactor stage. In addition, in the usual reforming process an unequal distribution of catalyst is employed among the reactors.

In reforming it is important to obtain the highest yield of $C_5+$ liquid product possible for a given octane number. A decrease in $C_5+$ product represents the production of light hydrocarbon gases which have little value compared to gasoline. Thus, it is important in reforming to adjust the conditions to obtain as high a possible yield of $C_5+$ product and particularly as high a yield as possible of aromatics since aromatics represent the highest octane components of gasoline. Thus, for example, in the early stages of reforming, as in the first reaction zone, dehydrogenation of $C_6$-ring naphthenes and dehydroisomerization of alkylcyclopentanes to aromatics should predominate with little or no cracking to $C_6$-paraffins or light gases.

SUMMARY OF THE INVENTION

It has now been discovered that reforming of hydrocarbons to produce high octane gasoline can be accomplished in the presence of hydrogen and at reforming conditions using a catalyst comprising a mixture of (1) a layered crystalline clay-type aluminosilicate and (2) a platinum group component in association with a porous amorphous solid carrier.

It has been found that the catalyst mixture of (1) a layered crystalline clay-type aluminosilicate and (2) a platinum group component in association with a porous amorphous solid carrier is particularly useful as the catalyst in the first reactor of a plurality of reactors in series. The catalyst mixture has been found to possess excellent activity and selectivity for the conversion of $C_6$-ring naphthenes to aromatics and alkylcyclopentanes, e.g., methylcyclopentane, to aromatics. Aromatic production from naphthenes occurs without substantial cracking. Thus, as a particular embodiment of the present invention, a naphtha feed is contacted in a first reaction zone with a catalyst comprising a mixture of (1) a layered crystalline clay-type aluminosilicate and (2) a platinum group component in association with a porous amorphous solid carrier to convert substantial amounts of naphthenes, including alkylcyclopentanes, to aromatics without substantial cracking and then the effluent from the first reaction zone is contacted in a subsequent reaction zone or zones at reforming conditions in the presence of hydrogen with a catalyst comprising a platinum group component in association with a porous amorphous solid carrier, e.g., alumina, to convert paraffins to aromatics and to hydrocrack high molecular weight hydrocarbons to lower molecular weight hydrocarbons. A product of improved octane is recovered.

BRIEF DESCRIPTION OF THE DRAWINGS

The present invention will be better understood and further explained hereinafter with reference to the graphs in FIGS. 1–3.

DESCRIPTION OF THE INVENTION

Figure 2:
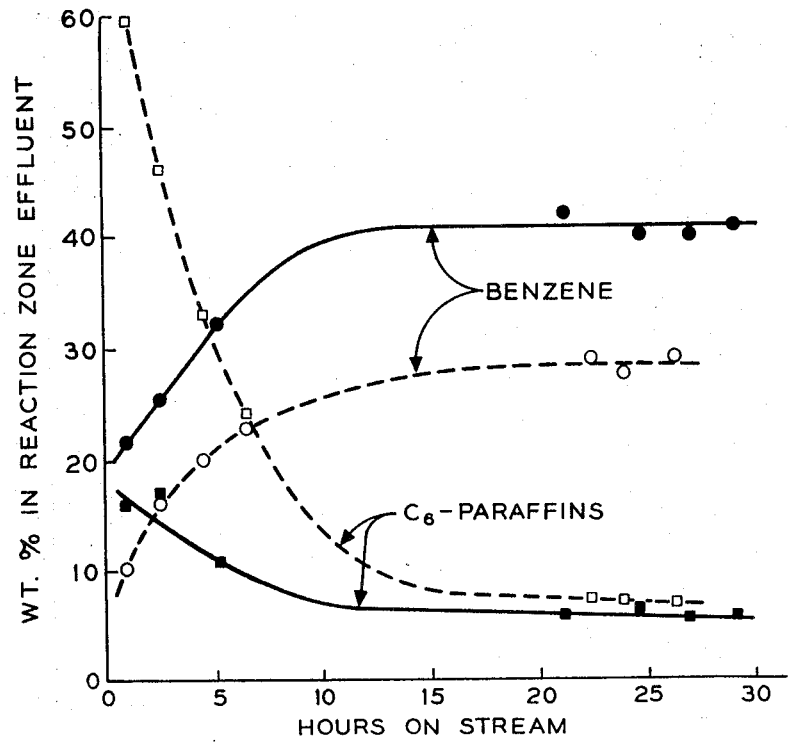
FIGS. 1 and 2 show, for comparison purposes, the results of reforming methylcyclopentane using a catalyst mixture comprising (1) a layered crystalline clay-type aluminosilicate and (2) platinum in association with alumina and the results of reforming methylcyclopentane with a catalyst comprising platinum in association with alumina, no layered crystalline clay-type aluminosilicate being present. The results are plotted as the weight percent of benzene and $C_6$-paraffins in the hydrocarbon product as a function of hours onstream.

The catalyst used in the present invention comprises at least two major components: (1) a layered crystalline clay-type aluminosilicate and (2) a platinum group component-porous amorphous solid carrier. Preferably the weight ratios of the layered crystalline clay-type aluminosilicate to platinum group component-porous amorphous solid carrier are from 1:9 to 9:1. Preferably the layered crystalline clay-type aluminosilicate is present in the finished catalyst composition in an amount of from 10 weight percent to 70 weight percent, more preferably from 20 weight percent to 70 weight percent.

The layered crystalline clay-type aluminosilicate may be any catalytically active layered aluminosilicate, although the synthetic hydrated layered crystalline clay-type aluminosilicate of Granquist (U.S. Pat. No. 3,252,757) and the dehydrated form of Capell and Granquist (U.S. Pat. No. 3,252,889) are preferred. Said layered crystalline clay-type aluminosilicates are referred to hereinafter for the sake of brevity as "layered aluminosilicate." The preferred hydrated layered aluminosilicate referred to in U.S. Pat. No. 3,252,757, incorporated herein by reference thereto, has the empirical formula

$$nSiO_2{:}Al_2O_3{:}mAB{:}xH_2O,$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists $F^-$, $OH^-$, $\tfrac{1}{2}O^{--}$ and mixtures thereof, and is internal in the latice, and $x$ is from 2.0 to 3.5 at 50 percent relative humidity, said mineral being characterized by a $d_{001}$ spacing at said humidity within the range which extends from a lower limit of about 10.4 A to an upper limit of about 12.0 A when A is monovalent, to about 14.7 A when A is divalent, and to a value intermediate between 12.0 A and 14.7 A when A includes both monovalent and divalent cations. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

The preferred dehydrated layered aluminosilicate referred to in U.S. Pat. No. 3,252,889, incorporated herein by reference thereto, has the empirical formula:

2.4 to 3.0 $SiO_2$:$Al_2O_3$:0.2 to 0.6AB wherein the layer lattices comprise silica ($SiO_2$), alumina ($Al_2O_3$) and B; and wherein A is one equivalent of an exchangeable ration selected from the group consisting of hydrogen, alkali metal, and alkaline earth metal ions, and mixtures thereof; and wherein B is one equivalent to an anion selected from the group consisting of fluoride, hydroxyl, and oxygen ions, and mixtures thereof;

said crystalline material being further characterized by a $d_{001}$ spacing ranging from 9.6 to 10.2 Angstrom units determined at 50 percent relative humidity and being predominantly ordered in two dimensions.

The dehydrated layered aluminosilicate of U.S. Pat. No. 3,252,889 is obtained from the hydrated layered aluminosilicate of U.S. Pat. No. 3,252,757 by calcination at a temperature within the range of 600° to 1,450° F., preferably 600° to 1,200° F. Upon calcination of the hydrated form, and removal of water, the $d_{001}$ spacing of the aluminosilicate collapses somewhat, resulting in a layered aluminosilicate of a smaller $d_{001}$ spacing. According to the teachings of U.S. Pat. No. 3,252,889, the collapse is irreversible and the dehydrated layered aluminosilicate is no longer capable of swelling—apparently the removal of water from the hydrated form results in a new and different chemical and indeed mineralogical species from the starting material.

The layered aluminosilicates are to be distinguished from the crystalline zeolitic molecular sieve components which have well-ordered and uniform pore structures as a result of the crystalline structures having bonds that are substantially equally strong in three dimensions. Such crystalline zeolitic aluminosilicates as, for example, zeolite X referred to in U.S. Pat. No. 2,882,244 and zeolite Y referred to in U.S. Pat. No. 3,130,007 are found to be too acidic to be useful in reforming. Thus, the crystalline zeolitic molecular sieves result in excessive hydrocracking of the hydrocarbon naphtha feed components.

Generally, when the layered aluminosilicate is in a sodium form, it is preferred for the process of the present invention that the sodium ions be replaced with other ions lower in the electromotive series than sodium. The sodium ion concentration on the layered aluminosilicate should preferably be less than about one weight percent. Thus, the layered aluminosilicate may contain, in place of the sodium, ions such as, e.g., calcium, magnesium, strontium, barium, rare earth metal ions, Groups IV through VIII metal ions, etc. It is particularly preferred that the layered aluminosilicate exists substantially in the ammonia or hydrogen form and that it be maintained substantially free of any catalytic loading metal or metals. When a sodium form of the layered aluminosilicate is one of the starting materials, it may be converted to the ammonia or hydrogen form by ion-exchange prior to being combined with the platinum group component-porous amorphous solid carrier. Alternately it may be combined with the other catalytic components, i.e., the platinum group component-porous amorphous solid carrier, and then converted to the ammonia or hydrogen form by ion-exchange.

The other component of the catalyst mixture used in the present invention comprises a platinum group component associated with a porous amorphous solid carrier. The porous amorphous solid carrier should not contain any crystalline zeolitic or layered aluminosilicate material. The porous amorphous solid carrier can include a variety of materials. Preferably the porous amorphous solid carriers are generally the inorganic oxides, particularly inorganic oxides having surface areas of 50 to 750 m.²/gm. and preferably 150 to 750 m.²/gm. The carrier can be a natural or synthetically produced inorganic oxide or a combination of inorganic oxides. Typical inorganic oxide supports which can be used are silica, alumina, magnesia and zirconia. It is particularly desired that the porous amorphous solid carrier not be too acidic for reforming. Acidic carriers can result in excessive cracking of the feed to lower boiling hydrocarbons which lower boiling hydrocarbons have less value than the $C_5+$ gasoline boiling range materials.

Alumina is a particularly preferred porous amorphous solid carrier. Any of the forms of alumina suitable for a support for a reforming catalyst can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

Another particularly preferred amorphous solid carrier is silica. A variety of methods are available for producing suitable silica supports. Silica can be produced by hydrolyzing tetraethyl orthosilicate with aqueous HCl solution. Likewise, silica can be prepared by contacting silicon tetrachloride with a cold methanol and water solution or with 95 percent ethyl alcohol, or with cold water or ice. Also silica can be prepared by contacting sodium silicate with an ion-exchange resin to remove the sodium or by contacting with an acid at a pH of about 2.5 or less.

The platinum group component which is associated with the porous amorphous solid carrier embraces all the members of Group VIII of the Periodic Table having an atomic weight greater than 100 as well as compounds and mixtures of any of these. Thus, the platinum group components comprise the Group VIII noble metals, e.g., platinum, palladium, iridium, ruthenium, rhodium and osmium. Platinum is the preferred component because of its better reforming activity. The platinum group component should be present in an amount of from 0.01 to 5 weight percent, preferably 0.01 to 3 weight percent. The weight percent of the platinum group component calculated as metal is based only on the platinum group component-porous amorphous solid carrier portion of the catalyst mixture. The greater the concentration of layered aluminosilicate in the finished catalyst, the more desirable to have a higher weight percent of platinum group component on the porous amorphous solid carrier. Thus, for example, when the layered aluminosilicate concentration is above 50 weight percent of the total catalyst, the platinum concentration on the porous amorphous solid carrier should be preferably greater than one weight percent.

Other components in addition to the platinum group component can be present with the porous amorphous solid carrier. It is particularly preferred that rhenium be present, for example, in an amount of from 0.01 to 5 weight percent and preferably 0.01 to 2 weight percent, based on the porous amorphous solid carrier portion of the mixture. Regardless of the form in which rhenium exists on the catalyst, whether as metal or compound, the weight percent is calculated as the metal. Rhenium significantly improves the yield stability of the catalyst; that is, a process using a catalyst comprising platinum and rhenium in association with a porous amorphous solid carrier has a significantly lower yield decline throughout the reforming process than a catalyst comprising platinum without rhenium. Platinum-rhenium catalyst is more fully described in U.S. Pat. No. 3,415,737.

The portion of the catalyst mixture comprising the platinum group component in association with the porous amorphous solid carrier can be prepared by a variety of methods; that is, the platinum group component can be associated with the porous solid carrier by impregnation, ion-exchange, coprecipitation, etc. Generally, it is preferred to incorporate the platinum group component by impregnation. When rhenium is incorporated along with the platinum group component, the rhenium component can also be associated with the carrier by various techniques, e.g., impregnation, ion-exchange, coprecipitation, etc. Preferably, the platinum group component and rhenium component are associated with the carrier by impregnation, either simultaneously or sequentially. Particularly preferred platinum group compounds for use in impregnation include chloroplatinic acid, ammonium chloroplatinates, polyammineplatinum salts, palladium chloride, etc. Suitable rhenium compounds are perrhenic acid, ammonium or potassium perrhenates, etc.

The layered aluminosilicate and the platinum group component-porous amorphous solid carrier can be admixed with each other in a number of different ways. For example, the layered aluminosilicate can be suspended and distributed throughout a porous amorphous solid carrier matrix. Thus, the layered aluminosilicate can be dispersed in a sol of the porous amorphous solid carrier, e.g., a siliceous sol or aluminous sol, prior to gelation of the sol. Alternatively the layered aluminosilicate can be dispersed in a hydrogel of the porous amorphous solid carrier. Intimate admixture of the layered aluminosilicate in the porous amorphous solid carrier may be accomplished also by ball milling the two materials together over an extended period of time, preferably in the presence of water. Care should be exercised when he layered aluminosilicate in a matrix of porous amorphous solid carrier that the platinum group component is not distributed throughout or in the layered aluminosilicate.

It is particularly preferred that the catalyst mixture consist of a physical particle-form mixture of the layered aluminosilicate and the platinum group component-porous amorphous solid carrier. A physical particle-form catalyst mixture can be prepared by mixing the layered aluminosilicate and the platinum group component-porous amorphous solid carrier in the form of discrete particles or the components can be admixed, pelleted, cast, molded or otherwise formed into pieces of desired size and shape such as rods, spheres, pellets or other configuration. The particle size of the individual components of the physical mixture may be very small, e.g. less than about 50 microns. Alternately, the particles may be sufficiently large and distinct as to permit ready separation thereof by mechanical means which in turn makes possible separate regeneration, reactivation, and replacement of the two components. Accordingly, the particle size of the two components making up the particle-form physical mixture may fall within the approximate range of 2 to 50 mesh (Tyler).

The catalyst can be promoted for reforming by the addition of halides, particularly fluorides or chlorides. Bromides may also be used. The halides provide a limited amount of acidity to the catalyst which is beneficial to most reforming operations. The catalyst mixture can be promoted with from 0.1 to 3 weight percent total halide. Halides can be incorporated onto the catalyst at any particularly suitable stage of catalyst manufacture; for example, the halides can be incorporated onto the porous amorphous solid carrier prior to or following admixture with the layered aluminosilicate. Also, the halide can be incorporated onto the catalyst carrier prior to or following incorporation of the platinum group component with the porous amorphous solid carrier. Halide can also be incorporated onto the catalyst during incorporation of the platinum group component or rhenium component; thus, impregnation of the porous amorphous solid carrier with chloroplatinic acid normally results in halide addition to the catalyst.

Prior to use in reforming the catalytic mixture of (1) a layered aluminosilicate and (2) a platinum group component in association with a porous amorphous solid carrier can be calcined at an elevated temperature in the presence of an oxidizing atmosphere as, for example, air. Calcination temperatures can vary from preferably above 500° F. and generally from 700° to 1,000° F. Higher temperatures may also be used. Excessive temperatures, that is, above 1,300° F. should not be used during calcination inasmuch as the crystallinity of the layered aluminosilicate may be destroyed.

It is often helpful to sulfide the catalyst mixture prior to reforming. The sulfiding may be accomplished by passing $H_2S$ or an organic sulfur compound, e.g., dimethyldisulfide, which converts to $H_2S$ in the presence of hydrogen, in contact with the catalyst along with hydrogen. Generally, the sulfiding is preceded by contacting the catalyst mixture in the presence of hydrogen for at least 0.1 hour and preferably at least 0.5 hour. Following sulfiding of the catalyst, hydrogen is usually continued in contact with the catalyst for a period of time of at least 0.1 hour. The sulfiding has been found to help improve the selectivity of the catalyst for the conversion of alkylcyclopentanes to aromatics. Thus, ring opening of the alkylcyclopentanes, which results in the formation of paraffins, is hindered by sulfiding the catalyst prior to reforming. Sulfiding of the catalyst can be accomplished in situ just prior to the introduction of naphtha in contact with the catalyst. The sulfiding can also occur during the period of time that naphtha is being introduced into contact with the catalyst.

The process of the present invention is advantageously utilized to reform naphtha boiling range feedstocks of varied hydrocarbon compositions. In general, the hydrocarbon feedstocks employed in the reforming operation are light hydrocarbon oils, e.g., naphthas, boiling within the range of from 70° to 550° F. and preferably from 150° to 450° F. The feedstock can be, for example, either a straight run thermally cracked or catalytically cracked naphtha or blends thereof. It is preferred that the feed be essentially sulfur-free particularly when the catalyst comprises platinum and rhenium. By "essentially sulfur-free" is meant that the feed should contain preferably less than 10 p.p.m. sulfur and more preferably less than 5 p.p.m. and still more preferably less than about 1 p.p.m. by weight.

The process of the present invention is particularly advantageous when the feed contains significant amounts of naphthenes, e.g., alkylcyclopentanes. Thus, it is preferred that the feed contain at least 10 volume percent naphthenes (such as alkylcyclopentanes, e.g., methylcyclopentane). The catalyst mixture can also be utilized in the conversion of a pure alkylcyclopentane stream to aromatics at suitable dehydroisomerization reaction conditions.

The reforming of naphtha boiling range hydrocarbons is preferably carried out at a temperature between about 600° F. and 1,100° F. and preferably 700° to 1,050° F. The pressure in reforming can be atmospheric or superatmospheric; however, the pressure will generally lie within the range of 25 to 1,000 p.s.i.g., preferably 50 to 750 p.s.i.g., and more preferably from 100 to 500 p.s.i.g. The reforming conditions will depend in large measure on the feeds used and upon the desired octane rating of the product. Temperature and pressure can be correlated with the liquid hourly spaced velocity (LHSV) to favor any particularly desirable reforming reaction as, for example, aromatization, isomerization or dehydrogenation. In general the liquid hourly space velocity will be from 0.1 to 10 and preferably from 1 to 5. The molar ratio of hydrogen to hydrocarbon will vary from 0.5 to 20 and preferably from 1 to 10. The hydrogen may be bottled hydrogen or may be recycle hydrogen, i.e., hydrogen recovered from the effluent of the reaction zone, purified and returned to the inlet of the reaction zone.

While the catalyst mixture comprising the layered aluminosilicate and the platinum group component-porous amorphous solid carrier can be utilized for reforming at the general reforming conditions referred to above, it is particularly preferred that the catalyst mixture be used at reforming conditions including a temperature of less than 900° F. and preferably within the range of 750° to 900° F. The layered aluminosilicate has optimum activity and selectivity at the lower reaction temperatures. It is also particularly preferred when using the catalyst mixture that the pressure be less than about 400 p.s.i.g. and more preferably less than 300 p.s.i.g. The lower pressure is more favorable for the conversion of $C_5$-ring naphthenes, e.g., alkylcyclopentanes, to aromatics. Thus, the full advantage of the e.g., mixture for the conversion of naphthenes to aromatics is obtained at the lower pressures. It is also a preferred feature of the present invention that a small amount of water be present in the reaction zone during the reforming in order to increase the selectivity characteristics of the catalyst mixture for conversion of naphthenes and/or alkylcyclopentanes to aromatics. Thus, the water partial pressure in the reaction zone preferably should be within the range of from 0.01 to 0.1 p.s.i.g.

As indicated previously, a preferred embodiment of the present invention comprises reforming a naphtha hydrocarbon feed in a plurality of adiabatic reactors in series, each of which is associated with a heater adapted to preheat the feed. The first reactor should contain a catalyst mixture of (1) a layered aluminosilicate and (2) a platinum group component in association with a porous amorphous solid carrier. The second stage or second and subsequent reactors desirably contain a catalyst comprising a platinum group component in association with a porous amorphous solid carrier, no layered aluminosilicate being present. Preferably the acidity of the catalyst in the second and subsequent reactors is low. Thus, the halide level should preferably be less than about one weight percent. The platinum group component associated with the catalyst in the second and subsequent reactors is preferably present in an amount above about one weight percent. The general description above relating to that portion of the catalyst mixture comprising the platinum group component in association with the porous amorphous solid carrier is descriptive of the catalyst which can be used in the second and subsequent reactors of a reforming system using a plurality of reactors in series. By means of the preferred embodiment, a high $C_5$+ liquid yield can be obtained inasmuch as the use of different catalysts and generally different reaction conditions permit optimization of the several reactions which result in the production of aromatics. Thus in the first reactor the conversion of naphthenes and alkylcyclopentanes to aromatics is optimized and in the second reactor and subsequent reactors, e.g., third reactor, the dehydrocyclization, hydrocracking and paraffin isomerization reactions are optimized.

As another embodiment of the present invention, a naphtha feed containing $C_6$ hydrocarbons, e.g., methylcyclopentane, can be reformed to produce high yields of high-octane gasoline by separating or fractionating the naphtha feed into at least two streams, a $C_6$ hydrocarbon first stream and a second stream containing the other naphtha components, contacting the first stream in the presence of hydrogen with a catalyst mixture of (1) a layered crystalline clay-type aluminosilicate and (2) a platinum group component in association with a porous amorphous solid carrier at reaction conditions to produce high yields of aromatics and contacting the second stream in the presence of hydrogen with a catalyst comprising a platinum group component in association with a porous amorphous solid carrier, no layered aluminosilicate being present at reaction conditions to produce high octane product and then combining the product of the two streams.

The present invention may be better understood by reference to the following examples.

EXAMPLE 1

A catalyst comprising 50 weight percent synthetic layered crystalline clay-type aluminosilicate, as described in U.S. Pat. No. 3,252,757, and 50 weight percent of a platinum-alumina composite was prepared by physically mixing the two components. The layered aluminosilicate existed substantially as the hydrogen form. The platinum-alumina component contained 1.2 weight percent platinum and was prepared by impregnating alumina with chloroplatinic acid in sufficient concentration to provide the desired amount of platinum on the alumina. The mixture was pelleted, crushed and screened to 28–60 mesh and finally calcined in air for 2 hours at 700° F.

For comparison purposes, a catalyst comprising 1.2 weight percent platinum on alumina was prepared by impregnating alumina with chloroplatinic acid. This catalyst was also crushed and screened to 28–60 mesh and calcined in air for 2 hours at 700° F.

Both catalysts were tested for the reforming of methylcyclopentane to aromatics, i.e., benzene. The reaction conditions in both cases included a temperature of 850° F., a pressure of 160 p.s.i.g., a hydrogen to hydrocarbon mole ratio of 3.5 and a liquid hourly space velocity of 8, based on the platinum-alumina component. 1-hexanol in an amount equivalent to 500 p.p.m. water was added to the feed in both cases to rapidly equilibrate the catalysts for methylcyclopentane conversion. Thus, shorter onstream times were necessary in order to determine the effectiveness of the catalysts for methylcyclopentane conversion. The amount of platinum-alumina catalyst used for the comparison test was the same as that used in the physical mixture.

Figure 1:
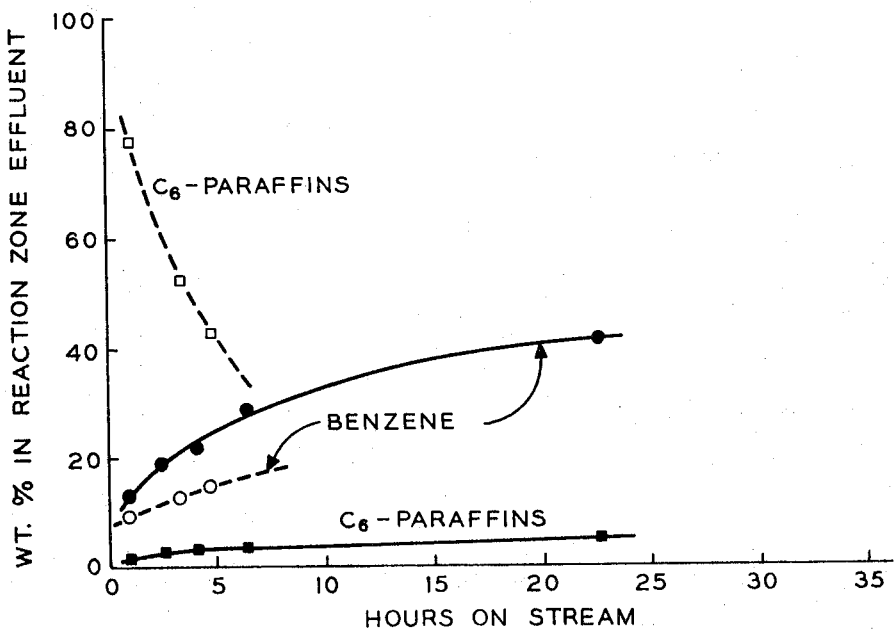

The results of reforming methylcyclopentane to benzene are shown in FIG. 1. FIG. 1 is a graph of the weight percent of the respective components in the effluent from the reaction zone as a function of the hours onstream. The solid lines are for the process using the catalyst mixture. The dashed lines are for the process using only the platinum-alumina catalyst. The high selectivity of the catalyst mixture for converting methylcyclopentane to benzene is shown by the high yield of benzene produced; the yield is significantly higher than the yield of benzene produced using the platinum-alumina catalyst without a layered aluminosilicate in association therewith. Thus, the undesirable cracking reaction or ring opening reaction is substantially eliminated using the catalyst comprising a layered aluminosilicate in admixture with a platinum-alumina component. A platinum-alumina catalyst by itself results in significant ring opening particularly during the early stages of reforming as seen in FIG. 1.

EXAMPLE 2

A catalyst comprising a physical mixture of (1) a layered crystalline clay-type aluminosilicate as described in U.S. Pat. NO. 3,252,757 (2) platinum and rhenium on alumina was prepared and (3) kaolinite. The physical mixture comprised 25 weight percent of the layered aluminosilicate described in U.S. Pat. No. 3,252,757, 25 weight percent kaolinite, and 50 weight percent of the platinum-rhenium-alumina component. The layered aluminosilicate existed substantially in the hydrogen form. The platinum-rhenium-alumina component contained 1.2 weight percent platinum and 0.3 weight percent rhenuim. It was prepared by impregnating alumina with chloroplatinic acid and perrhenic acid in sufficient concentration to provide the desired amount of platinum and rhenium on alumina. As a result of the impregnation, approximately 1.2 weight percent chloride was introduced to the platinum-rhenium-alumina component. The physical mixture was pelleted, crushed and screened to 28–60 mesh and finally calcined in air for 2 hours at 700° F.

For comparison purposes a catalyst comprising 0.6 weight percent platinum and 0.6 weight percent rhenium associated with alumina was prepared by impregnating alumina with chloroplatinic acid and perrhenic acid. The catalyst also contained approximately 0.6 weight percent chloride. The catalyst was crushed and screened to 28-60 mesh and calcined in air for 2 hours at 700° F.

The catalysts were tested for the reforming of methylcyclopentane to aromatics, i.e. benzene, at reaction conditions including a temperature of 850° F., a pressure of 160 p.s.i.g., a hydrogen to hydrocarbon mole ratio of 3.5 and a liquid hourly space velocity of 4. 1-hexanol in an amount equivalent to 50 p.p.m. water was added to the feed in both cases. The volume of catalyst in both tests was the same.

The results of reforming methylcyclopentane to benzene are shown in FIG. 2 which is a graph of the weight percent of the respective components in the effluent from the reaction zone as a function of the hours onstream. The solid lines are for the process using the catalyst mixture of (1) layered aluminosilicate and (2) platinum-rhenium-alumina. The dashed lines are for the process using platinum-rhenium-alumina is noted that the selectivity of the catalyst mixture for converting methylcyclopentane to benzene is very high; thus, the yield of benzene produced is significantly higher than the yield of benzene produced using the platinum-rhenium-alumina catalyst, no layered aluminosilicate being present. It is also observed that the platinum-rhenium-alumina catalyst by itself results in significant ring opening, particularly during the early stages of reforming. On the other hand, the catalyst mixture does not exhibit substantial undesirable cracking or ring opening reactions.

EXAMPLE 3

A catalyst comprising 20 weight percent synthetic layered crystalline clay-type aluminosilicate, as described in U.S. Pat. No. 3,252,757 and 80 weight percent of a platinum-alumina composite was prepared by physically mixing the two components. The layered aluminosilicate existed substantially in the hydrogen form; the platinum content of the catalyst mixture was approximately 0.6 weight percent; the platinum was associated only with the alumina and was prepared by impregnating alumina with chloroplatinic acid in sufficient concentration to provide the desired amount of platinum on the alumina. Following preparation, the catalyst mixture was sulfided. Just prior to reforming, the catalyst was contacted in a hydrogen atmosphere for about 10 minutes at 500° F. and 60 minutes at 930° F.

The catalyst was used for reforming of a naphtha feedstock boiling within the range from 151° to 428° F. and comprising 23.4 volume percent aromatics, 36.5 volume percent paraffins and 40.1 volume percent naphthenes. The feed was essentially sulfur-free. The reforming conditions included a pressure of about 160 p.s.i.g., a liquid hourly space velocity of about 4 and a hydrogen to hydrocarbon mole ratio of 4, once-through hydrogen being used. The temperature was adjusted to maintain conversion to 99 F-1 clear octane product.

The catalyst was found to reform the naphtha feedstock, the starting temperature being about 938° F.

EXAMPLE 4

A catalyst comprising a physical mixture of (1) platinum on alumina and (2) nickel impregnated silica-magnesia was prepared. The commercially available silica-magnesia contained 70 percent silica and 30 percent magnesia. Nickel, as nickel nitrate, was impregnated onto the silica-magnesia, and the composite was then washed repeatedly with distilled water. The final catalyst contained about 4 weight percent nickel, calculated as metal. The purpose of impregnating nickel onto the silica-magnesia was to reduce the acidity of the silica-magnesia portion of the catalyst. The platinum on alumina component was prepared by impregnating the alumina with chloroplatinic acid in sufficient concentration to deposit 1.2 weight percent platinum on the alumina. The physical mixture contained 50 weight percent of each of the components; it was pelleted, crushed and screened to 28-60 mesh, and calcined in air for 2 hours at 700° F.

The catalyst was tested for the reforming of methylcyclopentane to aromatics, i.e., benzene, at reaction conditions including a temperature of 850° F., a pressure of 160 p.s.i.g., a hydrogen to hydrocarbon mole ratio of 3.5 and a liquid hourly space velocity of 4. 1-hexanol, equivalent to 500 p.p.m. water, was added to the feed.

Figure 3:
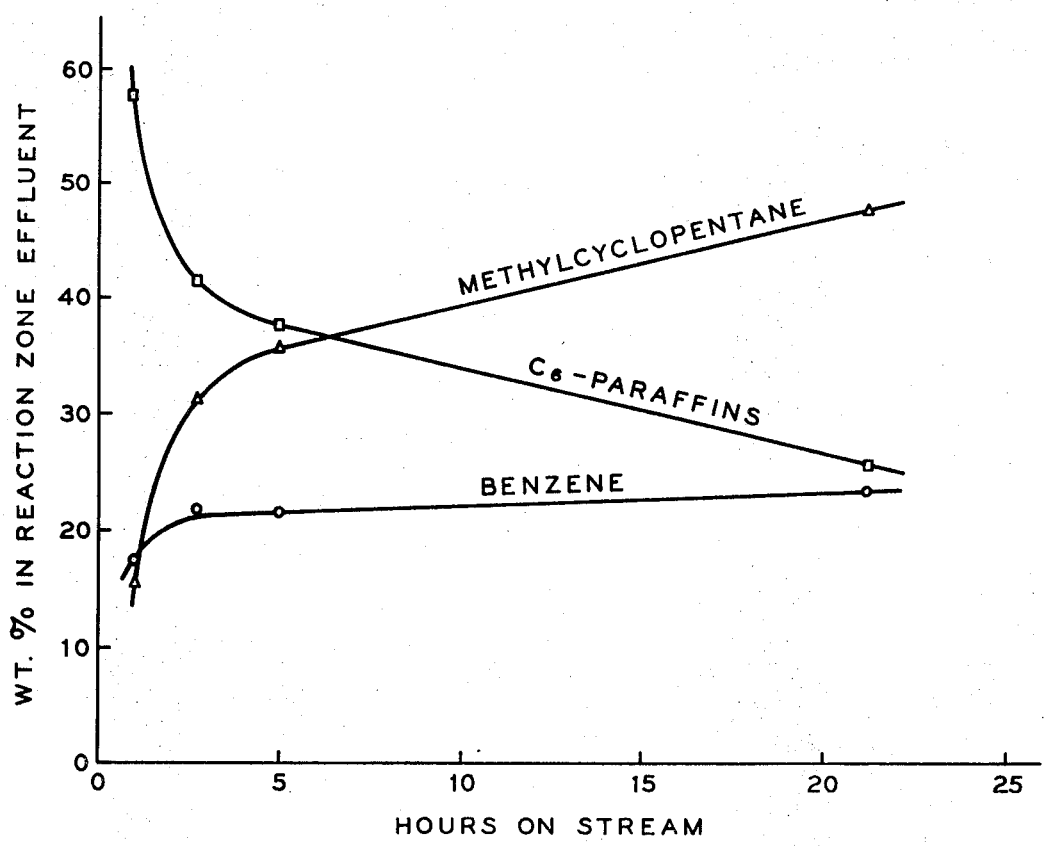
FIG. 3 shows the results of reforming methylcyclopentane using a catalyst comprising a mixture of (1) amorphous silica-magnesia having nickel impregnated thereon and (2) platinum in association with alumina.

The results of reforming of methylcyclopentane to benzene are shown in FIG. 3, which plots the weight percent of the respective product in the hydrocarbon effluent as a function of hours onstream. It is observed that the catalyst produces relatively low yields of benzene and high yields of $C_6^-$ paraffins. Thus, the catalyst is not selective for the conversion of methylcyclopentane to benzene. It is also observed that the methylcyclopentane content in the effluent increases with time, thus showing that the selectivity of the catalyst for methylcyclopentane conversion decreases with time.

This example thus shows that a physical mixture of an amorphous silica-magnesia component with a platinum-alumina component is not particularly beneficial for reforming methylcyclopentane to benzene.

The foregoing disclosure of this invention is not to be considered as limiting since many variations can be made by those skilled in the art without departing from the scope or spirit of the appended claims.

We claim:

1. A process for reforming a naphtha feed which comprises contacting said feed at reforming conditions and in the presence of hydrogen with a catalyst comprising a physical mixture of (1) a layered crystalline clay-type aluminosilicate selected from the group consisting of a layered crystalline clay-type aluminosilicate having the empirical formula:

$nSiO_2:Al_2O_3:mAB:xH_2O$ where the layer lattices comprise aid silica, said alumina, and said B, and where $n$ is from 2.4 to 3.0, $m$ is from 0.2 to 0.6, A is one equivalent of an exchangeable cation having a valence not greater than 2, and is external to the lattice, B is chosen from the group of negative ions which consists of $F^1$, $OH^1$, $½^{11}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A to an upper limit of about 12.0 A when A is monovalent, to about 14.7 A when A is divalent, and to a value intermediate between 1200 A and 14.7 A when A includes both monovalent and divalent cations; a layered crystalline clay-type aluminosilicate having the empirical formula:

2.4 to 3.0 $SiO_2:Al_2O_3:0.2$ to 0.6AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;

said crystalline material being further characterized by a $d_1$ spacing ranging from 9.6 to 10.2 Angstrom units determined at 50 percent relative humidity and being predominantly ordered in two dimensions; and combinations thereof, and (2) a platinum group component in association with a porous inorganic oxide of limited acidity.

2. The process of claim 1 wherein said layered crystalline clay-type aluminosilicate is present in an amount of from 10 to 70 percent, based on the total catalyst composition.

3. The process of claim 1 wherein said layered crystalline clay-type aluminosilicate contains less than about one weight percent sodium.

4. The process of claim 1 where in said layered crystalline clay-type aluminosilicate is substantially in the ammonia or hydrogen form.

5. The process of claim 1 wherein the amount of platinum group component in association with the porous inorganic oxide is from 0.01 to 5 weight percent.

6. The process of claim 1 wherein said platinum group component is platinum.

7. The process of claim 1 wherein said layered crystalline clay-type aluminosilicate has the empirical formula:

$$nSiO_2:Al_2O_3:mAB:xH_2O$$

where the layer lattices comprise said silica, said alumina, and said B, and where $n$ is from 2.4 to 3.0, $m$ is from 0.2 to 0.6, A is one equivalent of an exchangeable cation having a valence not greater than 2, and is external to the lattice, B is chosen from the group of negative ions which consists of $F^1$, $OH^1$, $\frac{1}{2}O^{11}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A to an upper limit of about 12.0 A when A is monovalent, to about 14.7 A when A is divalent, and to a value intermediate between 12.0 A and 14.7 A when A includes both monovalent and divalent cations.

8. The process of claim 1 wherein said layered crystalline clay-type aluminosilicate has the empirical formula:

2.4 to 3.0 $SiO_2$:$Al_2O_3$:0.2 to 0.6AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;

said crystalline material being further characterized by a $d_{001}$ spacing ranging from 9.6 to 10.2 Angstrom units determined at 50 percent relative humidity and being predominantly ordered in two dimensions.

9. A process as in claim 1, wherein said porous inorganic oxide comprises alumina.

10. A process as in claim 1, wherein said porous inorganic oxide is alumina.

11. A process as in claim 1, wherein said porous inorganic oxide is selected form the group consisting of silica, alumina, magnesia, and zirconia.

12. A process for conversion of naphthenes to aromatics which comprises contacting said naphthenes at dehydrogenation and dehydroisomerization reaction conditions and in the presence of hydrogen with a catalyst comprising a physical mixture of (1) a layered crystalline clay-type aluminosilicate selected from the group consisting of a layered crystalline clay-type aluminosilicate having the empirical formula:

$$nSiO_2:Al_2O_3:mAB:xH_2O$$

where the layer lattices comprise said silica, said alumina, and said B, and where $n$ is from 2.4 to 3.0, $m$ is from 0.2 to 0.6, A is one equivalent of an exchangeable cation having a valence not greater than 2, and is external to the lattice, B is chosen from the group of negative ions which consists of $F^1OH^1\frac{1}{2}O^{11}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4A to an upper limit of about 12.01 A when A is monovalent, to about 14.7 A when A is divalent, and to A value intermediate between 12.0 A and 14.7 A when A includes both monovalent and divalent cations:

a layered crystalline clay-type aluminosilicate having the empirical formula:

2.4 to 3.0 $SiO_2$:$Al_2O_3$:0.2 to 0.6AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;

said crystalline material being further characterized by a $d_{001}$ spacing ranging from 9.6 to 10.2 Angstrom units determined at 50 percent relative humidity and being predominantly ordered in two dimensions; and combinations thereof, and (2) a platinum group component in association with a porous inorganic oxide of limited acidity.

13. The process of claim 12 wherein said naphthenes comprise alkylcyclopentanes.

14. The process of claim 13 wherein said alkylcyclopentanes comprise methyloclopentane.

15. The process of claim 12 wherein said reaction conditions include a temperature of from 750to 900° F. and a pressure 750 than about 400 p.s.i.g.

16. In a reforming process wherein a naptha feed is contacted with a catalyst in a plurality of reactors in series at reforming conditions and in the presence of hydrogen to produce a product of improved octane rating, the improvement which comprises using as the catalyst in a first reactor a physical mixture comprising (1) a layered crystalline clay-type aluminiosilicate selected from the group consisting of a layered crystalline clay-type aluminosilicate having the empirical formula:

$$nSiO_2:Al_2O_3:mAB:xH_2O$$

where the layer lattices comprise said silica, said alumina, and said B, and where $n$ is from 2.4 to 3.0, $m$ is from 0.2 to 0.6, A is one equivalent of an exchangeable cation having a valence not greater than 2, and is external to the lattice, B is chosen from the group of negative ions which consists of $F^1$, $OH^1$, $\frac{1}{2}O^{11}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A to an upper limit of about 12.0 A when A is monovalent, to about 14.7 A when A is divalent, and to a value intermediate between 12.0 A and 14.7 A when A includes both monovalent and divalent cations;

a layered crystalline clay-type aluminosilicate having the empirical formula:

2.4 to 3.0 $SiO_2$:$Al_2O_3L$:0.2 to 0.6AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;

said crystalline material being further characterized by a $d_{001}$ spacing ranging from 9.6 to 10.2 Angstrom units determined at 50 percent relative humidity and being predominantly ordered in two dimensions; and combinations thereof, and (2) a platinum group component in association with a porous inorganic oxide of limited acidity, and using in said subsequent reactors a layered crystalline clay-type aluminosilicate-free composite comprising a platinum group component associated with a porous inorganic oxide carrier.

17. A process for reforming a naphtha feed containing naphthenes which comprises contacting said naphtha in a first reaction zone at reforming conditions including a temperature of from 750° to 900° F. and a pressure of from 50 to 400 p.s.i.g. and in the presence of hydrogen with a catalyst comprising a physical mixture of (1) a layered crystalline clay-type aluminosilicate selected from the group consisting of a layered crystalline clay-type aluminosilicate having the empirical formula:

$nSiO_2:Al_2O_3:mAB:xH_2O$ where the layer lattices comprise said silica, said alumina, and said B, and where $n$ is from 2.4 to 3.0, $m$ is from 0.2 to 0.6, A is one equivalent of an exchangeable cation having a valence not greater than 2, and is external to the lattice, B is chosen from the group of negative ions which consists of $F^1$, $OH^1$, $\frac{1}{2}O^{11}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A to an upper limit of about 12.0 A when A is monovalent, to about 14.7 A when A is divalent, and to a value intermediate between 12.0 and 14.7 A when A includes both monovalent and divalent cations;

a layered crystalline clay-type aluminosilicate having the empirical formula:

2.4 to 3.0 $SiO_2:Al_2O_3:0.2$ to 0.6AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof, and wherein B is one equivalent of an anion selected from the group consisting of fluoride, hydroxyl, and oxygen ions, and mixtures thereof;

said crystalline material being further characterized by $d_{001}$ spacing ranging from 9.6 to 10.2 Angstrom units determined at 50 percent relative humidity and being predominantly ordered in two dimensions; and combinations thereof, in an amount of from 10 to 70 weight percent based on the total catalyst, and (2) platinum in association with a porous inorganic oxide carrier selected from the group consisting of alumina and silica, the amount of platinum present with the porous inorganic oxide carrier being from 0.01 to 5 weight percent, to convert naphthenes to aromatics without substantial conversion of said naphthenes to paraffins, contacting the effluent from the first reaction zone in at least one other reaction zone, at reforming conditions including a temperature of 700° to 1,050° F. and a pressure of from 50 to 750 p.s.i.g. and in the presence of hydrogen with a catalyst comprising from 0.01 to 3 weight percent platinum in association with alumina.

* * * * *

PO-1050
(5/69)

UNITED STATES PATENT OFFICE
CERTIFICATE OF CORRECTION

Patent No. 3,617,521  Dated November 2, 1971

Inventor(s) ROBERT J. HOUSTON et al

It is certified that error appears in the above-identified patent and that said Letters Patent are hereby corrected as shown below:

Col. 1, line 61, and Col. 2, line 33, "$C_6$-paraffins" should read --$C_6$- paraffins--.

Col. 5, line 38, "whenhe" should read --when suspending the--.

Col. 7, line 13, "e.g.," should read --the catalyst mixture--.

Col. 7, line 22, "p.s.i.g." should read --p.s.i.a.--

Col. 9, lines 16-17, should read --using the platinum-rhenium-alumina catalyst. It is noted--.

Col. 10, line 42; Col. 11, line 20; Col. 11, line 70; Col. 12, line 48; and Col. 13, line 21, should read --$F^-$, $OH^-$, $\frac{1}{2}O^{--}$ and mixtures--.

Col. 12, line 29, "750" should read --less--.

Col. 12, line 60, ": $Al_2O_3L$ :" should read --:$Al_2O_3$:--.

Signed and sealed this 8th day of August 1972.

(SEAL)
Attest:

EDWARD M. FLETCHER, JR.  ROBERT GOTTSCHALK
Attesting Officer  Commissioner of Patents